US012626711B2

(12) United States Patent
Kim et al.

(10) Patent No.: US 12,626,711 B2
(45) Date of Patent: May 12, 2026

(54) HIGH-QUALITY VOICE SIGNAL PROCESSING DEVICE AND METHOD THROUGH REMOVAL OF AMBIENT NOISE BASED ON MULTI-SENSOR SIGNAL FUSION

(71) Applicant: Intus. Co., Ltd., Pohang-si (KR)

(72) Inventors: Seung Tae Kim, Seoul (KR); Ju In Lim, Seoul (KR); Yong Hun Song, Pohang-si (KR)

(73) Assignee: INTUS. CO., LTD., Pohang-si (KR)

( * ) Notice: Subject to any disclaimer, the term of this patent is extended or adjusted under 35 U.S.C. 154(b) by 132 days.

(21) Appl. No.: 18/367,316

(22) Filed: Sep. 12, 2023

(65) Prior Publication Data

US 2024/0096341 A1 Mar. 21, 2024

(30) Foreign Application Priority Data

Sep. 19, 2022 (KR) ........................ 10-2022-0118014

(51) Int. Cl.
*G10L 21/0208* (2013.01)

(52) U.S. Cl.
CPC ................................ *G10L 21/0208* (2013.01)

(58) Field of Classification Search
CPC ..... G10L 21/0208; G10L 15/20; G10L 25/15; G10L 25/93; G10L 21/0216;
(Continued)

(56) References Cited

U.S. PATENT DOCUMENTS

2014/0270231 A1* 9/2014 Dusan .................... H04R 3/005 381/74
2019/0272842 A1* 9/2019 Bryan ................ G10L 21/0272
2020/0135230 A1* 4/2020 Tong ....................... G10L 25/78

FOREIGN PATENT DOCUMENTS

KR 10-0873094 B1 12/2008
KR 10-2018-0093363 A 8/2018
(Continued)

OTHER PUBLICATIONS

Korean Office Action for related KR Application No. 10-2022-0118014 mailed Jun. 19, 2025 from Korean Intellectual Property Office.

*Primary Examiner* — Yogeshkumar Patel
(74) *Attorney, Agent, or Firm* — Paratus Law Group, PLLC

(57) ABSTRACT

A high-quality voice signal processing device through removal of ambient noise based on multi-sensor signal fusion, includes: a voice microphone sensor that senses and outputs a speaker's voice signal; an accelerometer sensor that senses vibration of the speaker's vocal cords and outputs a signal; a noise reduction processing MCU that extracts a voice section according to vocal cord vibration using the output signal of the accelerometer sensor, synthesizes a low-frequency component of the accelerometer sensor and a low-frequency component of the voice microphone sensor at different synthesis ratios based on a level of noise extracted from the output signal of the voice microphone sensor using voice section information, and restores and outputs a voice signal by adding the synthesized low-frequency components and a high-frequency component of the voice microphone sensor; and a wireless communication module that externally outputs the restored voice signal.

10 Claims, 8 Drawing Sheets

(58) Field of Classification Search
CPC ....... G10L 21/0232; G10L 2021/02165; G10L 2021/02166; G01P 15/00; G01P 15/18; H04R 1/46; H04R 3/00; H04R 3/005; H04R 1/1083
See application file for complete search history.

(56) References Cited

FOREIGN PATENT DOCUMENTS

| | | | |
|---|---|---|---|
| KR | 10-2021-0101644 | A | 8/2021 |
| KR | 10-2022-0017080 | A | 2/2022 |

* cited by examiner

HIGH-QUALITY VOICE SIGNAL PROCESSING DEVICE AND METHOD THROUGH REMOVAL OF AMBIENT NOISE BASED ON MULTI-SENSOR SIGNAL FUSION

CROSS-REFERENCE TO PRIOR APPLICATION

This application claims priority to Korean Patent Application No. 10-2022-0118014 (filed on Sep. 19, 2022), which is hereby incorporated by reference in its entirety.

BACKGROUND

The present disclosure relates to voice signal processing, and more specifically, to a high-quality voice signal processing device and method through removal of ambient noise based on multi-sensor signal fusion, which enables robust voice signal processing in an external noise environment through multi-sensor signal fusion using an accelerometer sensor (ACC) and a voice microphone sensor (MIC).

In general, a microphone is a means for converting a sender's voice into an electrical signal and transmitting it to a receiver.

The microphones include a wired microphone, a wireless microphone, and the like, and are mostly configured in a manner that transmits voice coming out of a user's mouth while being mounted or located near the user's mouth.

Due to the inconvenience of general microphones, and due to excessive noise, impossibility of use when wearing a helmet or dustproof clothing, or unclear voice transmission of the general microphones, not only special workers such as security guards and special agents, but also ordinary people are increasingly using throat microphones that transmit voice through the resonance of the vocal cords.

The throat microphone, unlike the general microphone, transmits voice signals through the vibration of the vocal cords, so a user does not need to make loud sounds, which is useful for security personnel, and is also useful for ordinary people since it can transmit clearer voice signals without noise.

Meanwhile, since the throat microphone collects vibration signals according to the vibration of the vocal cords and converts them into electrical signals, it needs to be perfectly protected from the external environment and be able to remove noise in collecting the signals according to the vibration of the vocal cords. Accordingly, the throat microphone requires a very high level of technical skill.

FIG. 1 shows graphs of frequency characteristics of a voice microphone and a throat microphone, and FIG. 2 is a configuration diagram showing a noise removal principle through active noise canceling.

In general, the throat microphone uses an inductive vibration sensor as a means for converting vibration.

The inductive vibration sensor has a structure including a diaphragm, a coil, a permanent magnet, and the like, and the light coil is connected to the diaphragm. When the diaphragm and the coil vibrate together, the inductive vibration sensor converts vocal cord vibration into an electrical signal using the principle that the magnetic field around the coil is changed by the permanent magnet in the center of the coil and at the same time a voltage is generated in the coil.

However, in such an inductive vibration sensor, the frequency response decreases in proportion to the frequency. For this reason, the inductive vibration sensor has a problem in that it cannot properly transmit voice of a high frequency component compared to voice of a low frequency component, and the clarity of the voice is lowered.

A technology using an accelerometer sensor for the throat microphone has been introduced, but this also has limitations in obtaining a high-quality voice signal.

Meanwhile, active noise canceling technology is used to obtain a high-quality voice signal in a microphone environment, and it can effectively respond to and process regular low-frequency noise, but is not effective for irregular noise in the high-pitched range and may even cause noise in certain environments.

Accordingly, there is a demand for developing a new technology capable of processing an input noisy voice signal to obtain a high-quality voice signal.

PRIOR ART DOCUMENT

Patent Document (Patent Document 1) Korean Patent Application Publication No. 10-2021-0101644
(Patent Document 2) Korean Patent No. 10-0873094
(Patent Document 3) Korean Patent Application Publication No. 10-2018-0093363

SUMMARY

In view of the above, the present disclosure provides a high-quality voice signal processing device and method through removal of ambient noise based on multi-sensor signal fusion, which enables robust voice signal processing in an external noise environment as a multi-sensor signal fusion using an accelerometer sensor (ACC) and a voice microphone sensor (MIC).

The present disclosure provides a high-quality voice signal processing device and method through removal of ambient noise based on multi-sensor signal fusion, which enables efficient voice signal processing by extracting and removing noise from an output signal of the voice microphone sensor (MIC) using voice section information of the accelerometer sensor (ACC).

The present disclosure provides a high-quality voice signal processing device and method through removal of ambient noise based on multi-sensor signal fusion, which enables to increase the quality of a voice signal by determining a level of the noise extracted from the output signal of the voice microphone sensor (MIC) and synthesizing a low-frequency component of the accelerometer sensor (ACC) and a low-frequency component of the voice microphone sensor (MIC) at different synthesis ratios based on the determined noise level.

The present disclosure provides a high-quality voice signal processing device and method through removal of ambient noise based on multi-sensor signal fusion, which enables to obtain a high-quality voice signal by primarily removing noise from output signals of a first and a second voice microphone sensor (MIC1, MIC2) using voice section information utilizing an output signal of the accelerometer sensor (ACC), by secondarily removing noise from the output signals of the first and the second voice microphone sensor (MIC1, MIC2) using a beamforming algorithm, and by thirdly removing noise from the output signals of the first and the second voice microphone sensor (MIC1, MIC2) using the voice section information again.

The present disclosure provides a high-quality voice signal processing device and method through removal of ambient noise based on multi-sensor signal fusion, which enables precise voice signal processing in the process of synthesizing the low-frequency components of the accelerometer sensor (ACC) and the low-frequency components of the voice microphone sensor (MIC) by including further the low-frequency component of the accelerometer sensor (ACC) when the level of the noise extracted from the output signal of the voice microphone sensor (MIC) is higher than a reference value, and by including further the low-frequency component of the voice microphone sensor (MIC) when the level of the noise extracted from the output signal of the voice microphone sensor (MIC) is lower than the reference value.

The objects of the present disclosure are not limited to the above-mentioned objects, and other objects not mentioned will be clearly understood by those skilled in the art from the following description.

A high-quality voice signal processing device through removal of ambient noise based on multi-sensor signal fusion, according one embodiment of the present disclosure, comprises: a voice microphone sensor (MIC) that senses and outputs a speaker's voice signal; an accelerometer sensor (ACC) that senses vibration of the speaker's vocal cords and outputs a signal; a noise reduction processing MCU (microcontroller unit) that extracts a voice section according to vocal cord vibration using the output signal of the accelerometer sensor (ACC), synthesizes a low-frequency component of the accelerometer sensor (ACC) and a low-frequency component of the voice microphone sensor (MIC) at different synthesis ratios based on a level of noise extracted from the output signal of the voice microphone sensor (MIC) using voice section information, and restores and outputs a voice signal by adding the synthesized low-frequency components and a high-frequency component of the voice microphone sensor (MIC); and a wireless communication module that externally outputs the restored voice signal.

In this case, in synthesizing the low-frequency component of the accelerometer sensor (ACC) and the low-frequency component of the voice microphone sensor (MIC), the noise reduction processing MCU causes the low-frequency component of the accelerometer sensor (ACC) to be further included when the level of the noise extracted from the output signal of the voice microphone sensor (MIC) is higher than a reference value, and causes the low-frequency component of the voice microphone sensor (MIC) to be further included when the level of the noise extracted from the output signal of the voice microphone sensor (MIC) is lower than the reference value.

Further, the noise reduction processing MCU determines a signal outside the voice section in the output signal of the voice microphone sensor (MIC) as noise using the voice section information, extracts and removes the output signal determined as noise, and separates the output signal of the voice microphone sensor (MIC) in the voice section into a low-frequency component and a high-frequency component.

Further, the noise reduction processing MCU includes: a voice section extractor for extracting a voice section according to vocal cord vibration using the output signal of the accelerometer sensor (ACC); an ACC low-frequency component processing unit that processes the low-frequency component signal of the accelerometer sensor (ACC); an MIC noise extraction and removal unit that a signal outside the voice section in the output signal of the voice microphone sensor (MIC) as noise using the voice section information, and extracts and removes the signal determined as noise; a noise level determination unit that determines a level of the noise extracted from the output signal of the voice microphone sensor (MIC); an MIC low-frequency component processing unit and a MIC high-frequency component processing unit that separate and process the output signal of the voice microphone sensor (MIC) in the voice section into a low-frequency component and a high-frequency component; an MIC and ACC low-frequency component synthesis unit that synthesizes the low-frequency component of the accelerometer sensor (ACC) and the low-frequency component of the voice microphone sensor (MIC) at different synthesis ratios based on the noise level determined by the noise level determination unit; and a voice signal restoration output unit that restores and outputs a voice signal by adding the synthesized low-frequency components and the high-frequency component of the voice microphone sensor (MIC).

A high-quality voice signal processing device through removal of ambient noise based on multi-sensor signal fusion, according to another embodiment of the present disclosure, comprises: a first and a second voice microphone sensor (MIC1, MIC2) spaced apart from each other to sense and output a speaker's voice signal; an accelerometer sensor (ACC) that senses vibration of the speaker's vocal cords and outputs a signal; a noise reduction processing MCU that extracts a voice section according to vocal cord vibration using the output signal of the accelerometer sensor (ACC), synthesizes a low-frequency component of the accelerometer sensor (ACC) and low-frequency components of the first and the second voice microphone sensor (MIC1, MIC2) at different synthesis ratios based on a level of noise extracted from the output signals of the first and the second voice microphone sensor (MIC1, MIC2) using voice section information, and restores and outputs a voice signal by adding the synthesized low-frequency components and high-frequency components of the first and the second voice microphone sensor (MIC1, MIC2); and a wireless communication module that externally outputs the restored voice signal.

In this case, in synthesizing the low-frequency component of the accelerometer sensor (ACC) and the low-frequency components of the first and the second voice microphone sensor (MIC1, MIC2), the noise reduction processing MCU causes the low-frequency component of the accelerometer sensor (ACC) to be further included when the level of the noise extracted from the output signals of the first and the second voice microphone sensor (MIC1, MIC2) is higher than a reference value, and causes the low-frequency component of the first and the second voice microphone sensor (MIC1, MIC2) to be further included when the level of the noise extracted from the output signals of the first and the second voice microphone sensor (MIC1, MIC2) is lower than the reference value.

Further, the noise reduction processing MCU determines a signal outside the voice section in the output signals of the first and the second voice microphone sensor (MIC1, MIC2) as noise using the voice section information, extracts and removes the output signals determined as noise, and separates the output signals of the first and the second voice microphone sensor (MIC1, MIC2) in the voice section into a low-frequency component and a high-frequency component.

Further, the noise reduction processing MCU primarily removes noise from the output signals of the first and the second voice microphone sensor (MIC1, MIC2) using the voice section information, secondarily removes noise from the output signals of the first and second voice microphone sensors (MIC1, MIC2) from which the noise is primarily removed using a beamforming algorithm, and thirdly removes noise from the output signals of the first and the second voice microphone sensor (MIC1, MIC2) from which the noise is secondarily removed using the voice section information again.

The noise reduction processing MCU includes: a voice section extractor for extracting a voice section according to vocal cord vibration using the output signal of the accelerometer sensor (ACC); an ACC low-frequency component processing unit that processes the low-frequency component signal of the accelerometer sensor (ACC); a noise extraction and removal unit that performs a primary noise extraction and removal using the voice section information, a secondary noise extraction and removal using the beamforming algorithm, and a tertiary noise extraction and removal using the voice section information again on the output signals of the first and the second voice microphone sensor (MIC1, MIC2); a noise level determination unit that determines a level of the noise extracted through the first noise extraction and removal in the noise extraction and removal unit; an MIC low-frequency component processing unit and a MIC high-frequency component processing unit that separate and process the output signals of the first and the second voice microphone sensor (MIC1, MIC2) on which the tertiary noise extraction and removal has been performed into a low-frequency component and a high-frequency component; an MIC and ACC low-frequency component synthesis unit that synthesizes the low-frequency component of the accelerometer sensor (ACC) and the low-frequency components of the first and the second voice microphone sensor (MIC1, MIC2) at different synthesis ratios based on the noise level determined by the noise level determination unit; and a voice signal restoration output unit that restores and outputs a voice signal by adding the synthesized low-frequency components and the high-frequency components of the first and the second voice microphone sensor (MIC1, MIC2).

Further, the a noise extraction and removal unit includes: a first noise extraction and removal unit that extracts and primarily removes signals outside the voice section as noise from the output signals of the first and the second voice microphone sensor (MIC1, MIC2) using the voice section information; a second noise extraction and removal unit that secondarily removes noise from the output signals of the first and the second voice microphone sensor (MIC1, MIC2) from which the noise is firstly removed using a beamforming algorithm; and a third noise extraction and removal unit that extracts and thirdly removes signals outside the voice section as noise from the output signals of the first and second voice microphone sensor (MIC1, MIC2) from which the noise has been secondarily removed using the voice section information again.

A high-quality voice signal processing method through removal of ambient noise based on multi-sensor signal fusion, according to still another embodiment of the present disclosure, comprises: extracting a voice section according to vocal cord vibration using an output signal of an accelerometer sensor (ACC); determining a signal outside the voice section in an output signal of the voice microphone sensor (MIC) as noise using voice section information, extracting and removing the output signal determined as noise, and separating the output signal of the voice microphone sensor (MIC) in the voice section into a low-frequency component and a high-frequency component; determining a level of the noise extracted from the output signal of the voice microphone sensor (MIC); synthesizing a low-frequency component of the accelerometer sensor (ACC) and the low-frequency component of the voice microphone sensor (MIC) at different synthesis ratios based on the determined noise level; and restoring and outputting a voice signal by adding the synthesized low-frequency components and the high-frequency component of the voice microphone sensor (MIC).

In this case, in the synthesizing of the low-frequency component of the accelerometer sensor (ACC) and the low-frequency component of the voice microphone sensor (MIC), the low-frequency component of the accelerometer sensor (ACC) is further included when the level of the noise extracted from the output signal of the voice microphone sensor (MIC) is higher than a reference value, and the low-frequency component of the voice microphone sensor (MIC) is further included when the level of the noise extracted from the output signal of the voice microphone sensor (MIC) is lower than the reference value.

A high-quality voice signal processing method through removal of ambient noise based on multi-sensor signal fusion, according to still another embodiment of the present disclosure, comprises: extracting a voice section according to vocal cord vibration using an output signal of an accelerometer sensor (ACC); determining a signal outside the voice section in output signals of a first and a second voice microphone sensor (MIC1, MIC2) as noise using voice section information, and extracting and primarily removing the output signal determined as noise; secondarily removing noise from the output signals of the first and the second voice microphone sensor (MIC1, MIC2) from which the noise has been primarily removed using a beamforming algorithm; determining a signal outside the voice section as noise in the signal from which the noise has been secondarily removed, thirdly removing noise the signal determined as noise, and separating the output signals of the first and second voice microphone sensors (MIC1, MIC2) in the voice section into low-frequency components and high-frequency components; determining a level of the noise extracted from the output signals of the first and second voice microphone sensors (MIC1, MIC2); synthesizing a low-frequency component of the accelerometer sensor (ACC) and the low-frequency components of the first and second voice microphone sensors (MIC1, MIC2) at different synthesis ratios based on the determined noise level; and restoring and outputting a voice signal by adding the synthesized low-frequency components and the high-frequency components of the first and second voice microphone sensors (MIC1, MIC2).

In this case, in the synthesizing of the low-frequency component of the accelerometer sensor (ACC) and the low-frequency components of the first and second voice microphone sensors (MIC1, MIC2), the low-frequency component of the accelerometer sensor (ACC) is further included when the level of the noise extracted from the output signals of the first and second voice microphone sensors (MIC1, MIC2) is higher than a reference value, and the low-frequency components of the first and second voice microphone sensors (MIC1, MIC2) are further included when the level of the noise extracted from the output signals of the first and second voice microphone sensors (MIC1, MIC2) is lower than the reference value.

As described above, the high-quality voice signal processing device and method through removal of ambient noise based on multi-sensor signal fusion according to the present disclosure has the following effects.

First, the multi-sensor signal fusion using the accelerometer sensor (ACC) and the voice microphone sensor (MIC) enables robust voice signal processing in an external noise environment.

Second, efficient voice signal processing is possible by extracting and removing noise from the output signal of the voice microphone sensor (MIC) using the voice section information of the accelerometer sensor (ACC).

Third, the quality of the voice signal can be improved by determining the level of the noise extracted from the output signal of the voice microphone sensor (MIC) and synthesizing the low-frequency component of the accelerometer sensor (ACC) and the low-frequency component of the voice microphone sensor (MIC) at different synthesis ratio based on the determined noise level.

Fourth, high-quality voice signals can be obtained by primarily removing noise from the output signals of the first and the second voice microphone sensor (MIC1, MIC2) using the voice section information utilizing the output signal of the accelerometer sensor (ACC), by secondarily removing noise from the output signals of the first and the second voice microphone sensor (MIC1, MIC2) using the beamforming algorithm, and by thirdly removing noise from the output signals of the first and the second voice microphone sensor (MIC1, MIC2) using the voice section information again Fifth, precise voice signal processing is possible by, in the process of synthesizing the low-frequency component of the accelerometer sensor (ACC) and the low-frequency component of the voice microphone sensor (MIC), including further the low-frequency component of the accelerometer sensor (ACC) when the level of the noise extracted from the output signal of the voice microphone sensor (MIC) is higher than the reference value, and including further the low-frequency component of the voice microphone sensor (MIC) when the level of the noise extracted from the output signal of the voice microphone sensor (MIC) is higher than the reference value.

DETAILED DESCRIPTION

Hereinafter, a preferred embodiment of a high-quality voice signal processing device and method through removal of ambient noise based on multi-sensor signal fusion according to the present disclosure will be described in detail.

The characteristics and advantages of the high-quality voice signal processing device and method through removal of ambient noise based on multi-sensor signal fusion according to the present disclosure will become clear through a detailed description of each embodiment below.

Figure 1:
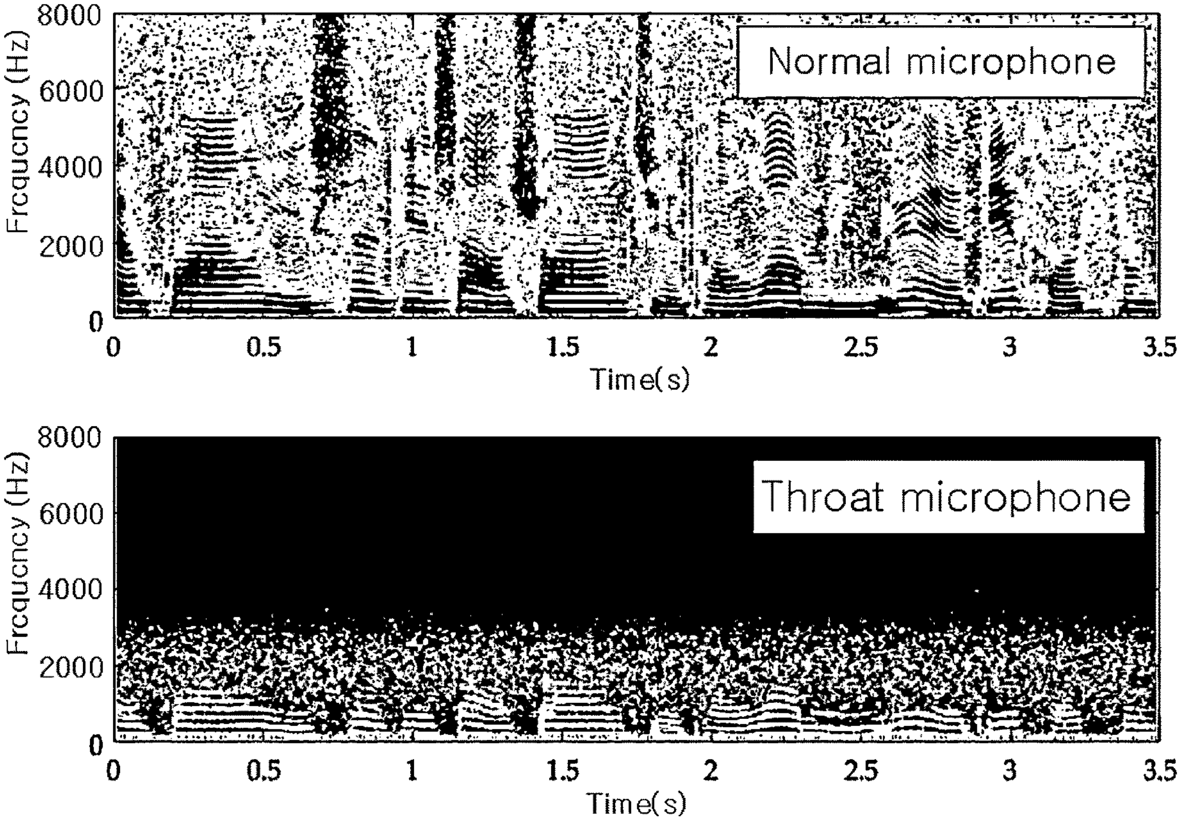
FIG. 1 shows graphs of frequency characteristics of a voice microphone and a throat microphone.
Figure 2:
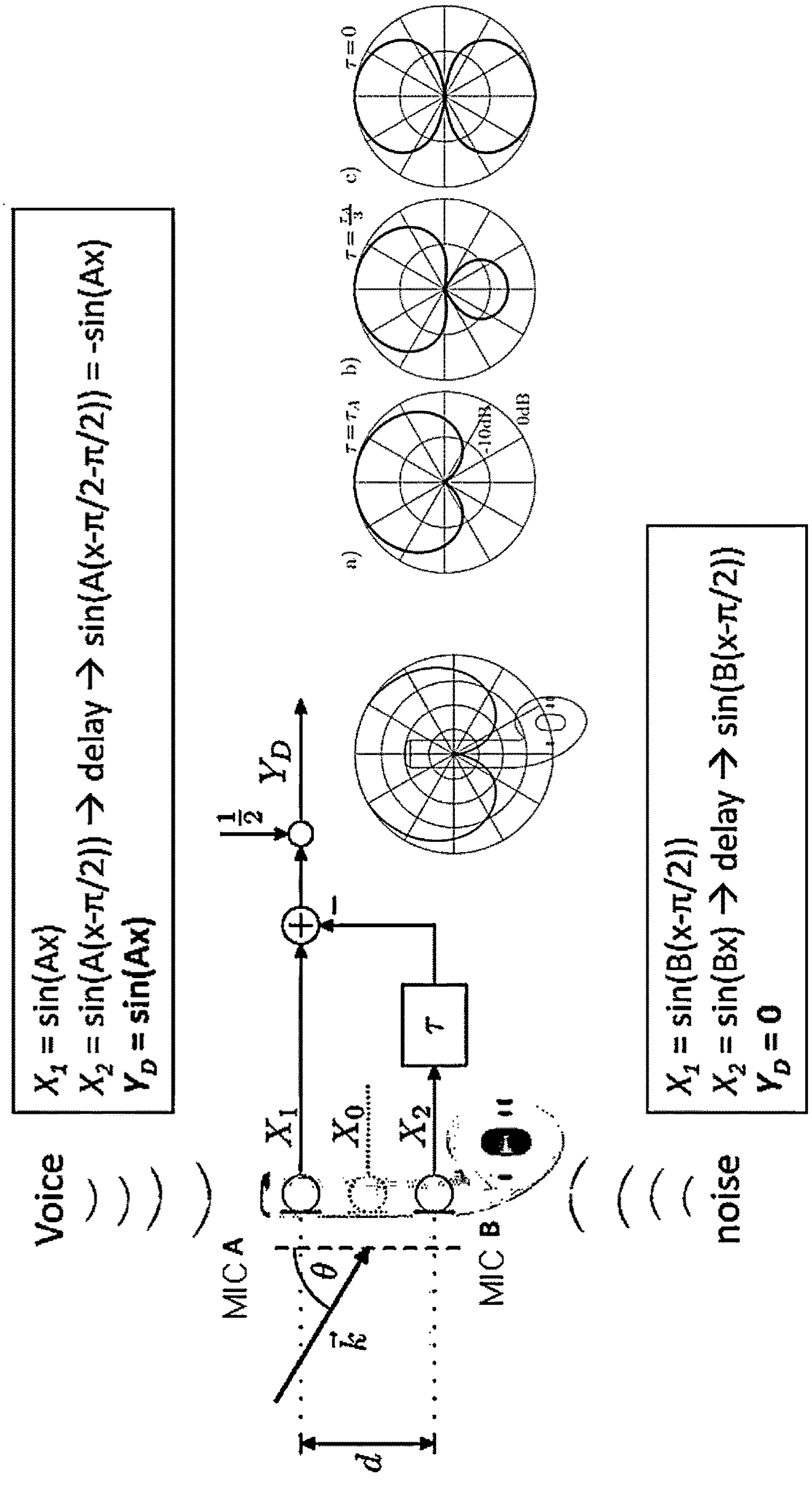
FIG. 2 is a configuration diagram showing a noise removal principle through active noise canceling.
Figure 3:
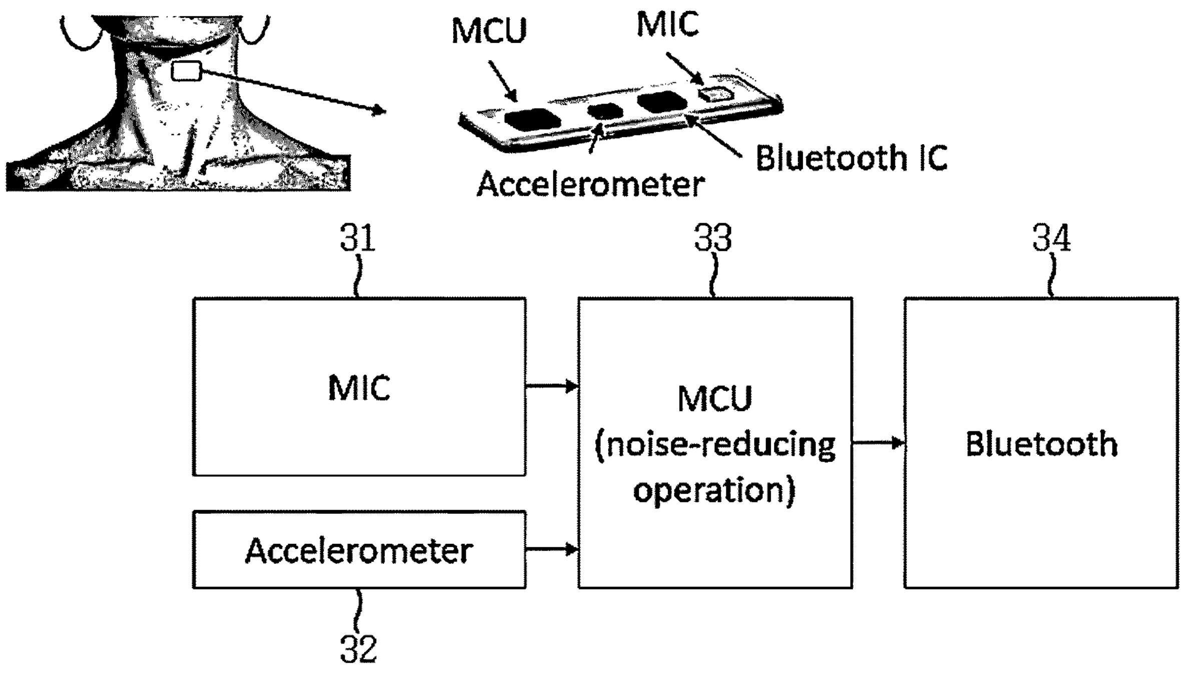
FIG. 3 is a configuration diagram of a voice signal processing device according to a first embodiment of the present disclosure.

FIG. 3 is a configuration diagram of a voice signal processing device according to a first embodiment of the present disclosure.

The terms used in the present disclosure have been selected from general terms that are currently widely used as much as possible while considering the functions in the present disclosure, but they may vary according to the intention of a person skilled in the art, the precedents, the emergence of new technologies, and the like. In addition, in a specific case, there is also a term arbitrarily selected by the inventors, and in this case, its meaning will be described in detail in the description of the present specification. Accordingly, the terms used in the present disclosure should be defined based on the meanings of the terms and the whole contents of the present disclosure, not simply the names of the terms.

When it is expressed that a certain part "includes" a certain component throughout the present specification, it means that the part may further include other components, not excluding other components unless otherwise stated. In addition, terms such as "... unit" and "module" described in the present specification mean a unit that processes at least one function or operation, which may be implemented as hardware or software or a combination of hardware and software.

The high-quality voice signal for processing device and method through removal of ambient noise based on multi-sensor signal fusion according to the present disclosure enables robust voice signal processing in an external noise environment through the multi-sensor signal fusion using an accelerometer sensor ACC and a voice microphone sensor MIC.

To this end, the voice signal processing device and method according to the present disclosure may include a configuration for extracting and removing noise from an output signal of the voice microphone sensor (MIC) using voice section information of the accelerometer sensor (ACC) to enable efficient voice signal processing.

The voice signal processing device and method according to the present disclosure may include a configuration for determining a level of noise extracted from the output signal of the voice microphone sensor (MIC), and synthesizing a low-frequency component of the accelerometer sensor (ACC) and a low-frequency component of the voice microphone sensor (MIC) at different synthesis ratios based on the determined noise level.

The voice signal processing device and method according to the present disclosure may include a configuration for primarily removing noise from output signals of a first and a second voice microphone sensor (MIC1, MIC2) using voice section information utilizing an output signal of the accelerometer sensor (ACC), secondarily removing noise from the output signals of the first and the second voice microphone sensor (MIC1, MIC2) using a beamforming algorithm, and thirdly removing noise from the output signals of the first and the second voice microphone sensor (MIC1, MIC2) using the voice section information again.

The voice signal processing device and method according to the present disclosure may include a configuration for enabling precise voice signal processing in the process of synthesizing the low-frequency component of the accelerometer sensor (ACC) and the low-frequency component of the voice microphone sensor (MIC) by including further low-frequency component of the accelerometer sensor (ACC) when a level of noise extracted from the output signal of the voice microphone sensor (MIC) is higher than a reference value, and by including further low-frequency components of the voice microphone sensor MIC when the level of the noise extracted from the output signal of the voice microphone sensor (MIC) is lower than the reference value.

According to the voice signal processing device and method according to the present disclosure, the accelerometer sensor (ACC) outputs a digital signal so that signal processing processes, such as noise extraction, noise level determination, low frequency component synthesis, and voice signal restoration, can be performed without a separate digital conversion process, which enables fast voice signal processing.

The configuration of the high-quality voice signal processing device through removal of ambient noise based on multi-sensor signal fusion according to the first embodiment of the present disclosure is as follows.

As shown in FIG. 3, the high-quality voice signal processing device according to the first embodiment of the present disclosure includes: a voice microphone sensor (MIC) 31 that senses and outputs a speaker's voice signal; an accelerometer sensor (ACC) 32 that senses vibration of the vocal cords while in contact with the speaker's neck and outputs a signal; a noise reduction processing MCU (micro-controller unit) 33 that extracts a voice section according to vocal cord vibration using the output signal of the accelerometer sensor (ACC), synthesizes a low-frequency component of the accelerometer sensor (ACC) 32 and a low-frequency component of the voice microphone sensor (MIC) 31 at different synthesis ratios based on a level of noise extracted from the output signal of the voice microphone sensor (MIC) 31 using voice section information, and restores and outputs a voice signal by adding the synthesized low-frequency components and a high-frequency component of the voice microphone sensor (MIC) 31; and a wireless communication module 34 that externally outputs the restored voice signal.

In this case, in the process of synthesizing the low-frequency component of the accelerometer sensor (ACC) 32 and the low-frequency component of the voice microphone sensor (MIC) 31, the noise reduction processing MCU 33 preferably causes the low-frequency component of the accelerometer sensor (ACC) 32 to be further included when the level of the noise extracted from the output signal of the voice microphone sensor (MIC) 31 is higher than a reference value, and causes the low-frequency component of the voice microphone sensor (MIC) 31 to be further included when the level of the noise extracted from the output signal of the voice microphone sensor (MIC) 31 is lower than the reference value.

Then, the noise reduction processing MCU 33 determines a signal outside the voice section in the output signal of the voice microphone sensor (MIC) 31 as noise using the voice section information, extracts and removes the output signal determined as noise, and separates the output signal of the voice microphone sensor (MIC) 31 in the voice section into a low-frequency component and a high-frequency component.

The detailed configuration of the noise reduction processing MCU 33 is as follows.

Figure 4:
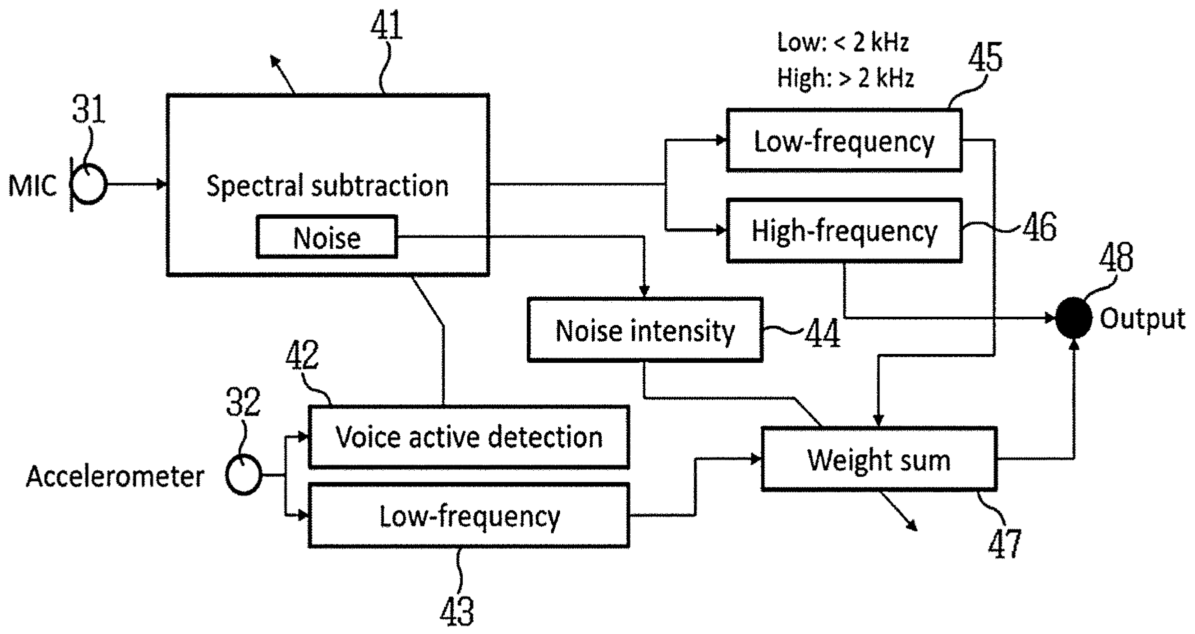
FIG. 4 is a detailed configuration diagram of a noise reduction processing MCU according to the first embodiment of the present disclosure.

FIG. 4 is a detailed configuration diagram of the noise reduction processing MCU 33 according to the first embodiment of the present disclosure.

As shown in FIG. 4, the noise reduction processing MCU 33 includes: a voice section extractor 42 for extracting a voice section according to vocal cord vibration using the output signal of the accelerometer sensor (ACC) 32; an ACC low-frequency component processing unit 43 that processes the low-frequency component signal of the accelerometer sensor (ACC) 32; an MIC noise extraction and removal unit 41 that determines a signal outside the voice section in the output signal of the voice microphone sensor (MIC) 31 as noise using the voice section information, and extracts and removes the signal determined as noise; a noise level determination unit 44 that determines a level of the noise extracted from the output signal of the voice microphone sensor (MIC) 41; an MIC low-frequency component processing unit 45 and a MIC high-frequency component processing unit 46 that separate and process the output signal of the voice microphone sensor (MIC) 31 in the voice section into a low-frequency component and a high-frequency component; an MIC and ACC low-frequency component synthesis unit 47 that synthesizes the low-frequency component of the accelerometer sensor (ACC) 32 and the low-frequency component of the voice microphone sensor (MIC) 31 at different synthesis ratios based on the noise level determined by the noise level determination unit 44; and a voice signal restoration output unit 48 that restores and outputs a voice signal by adding the synthesized low-frequency components and the high-frequency component of the voice microphone sensor (MIC) 31.

Hereinafter, a high-quality voice signal processing method through ambient through removal of ambient noise based on multi-sensor signal fusion according to the first embodiment of the present disclosure will be described in detail.

Figure 5:
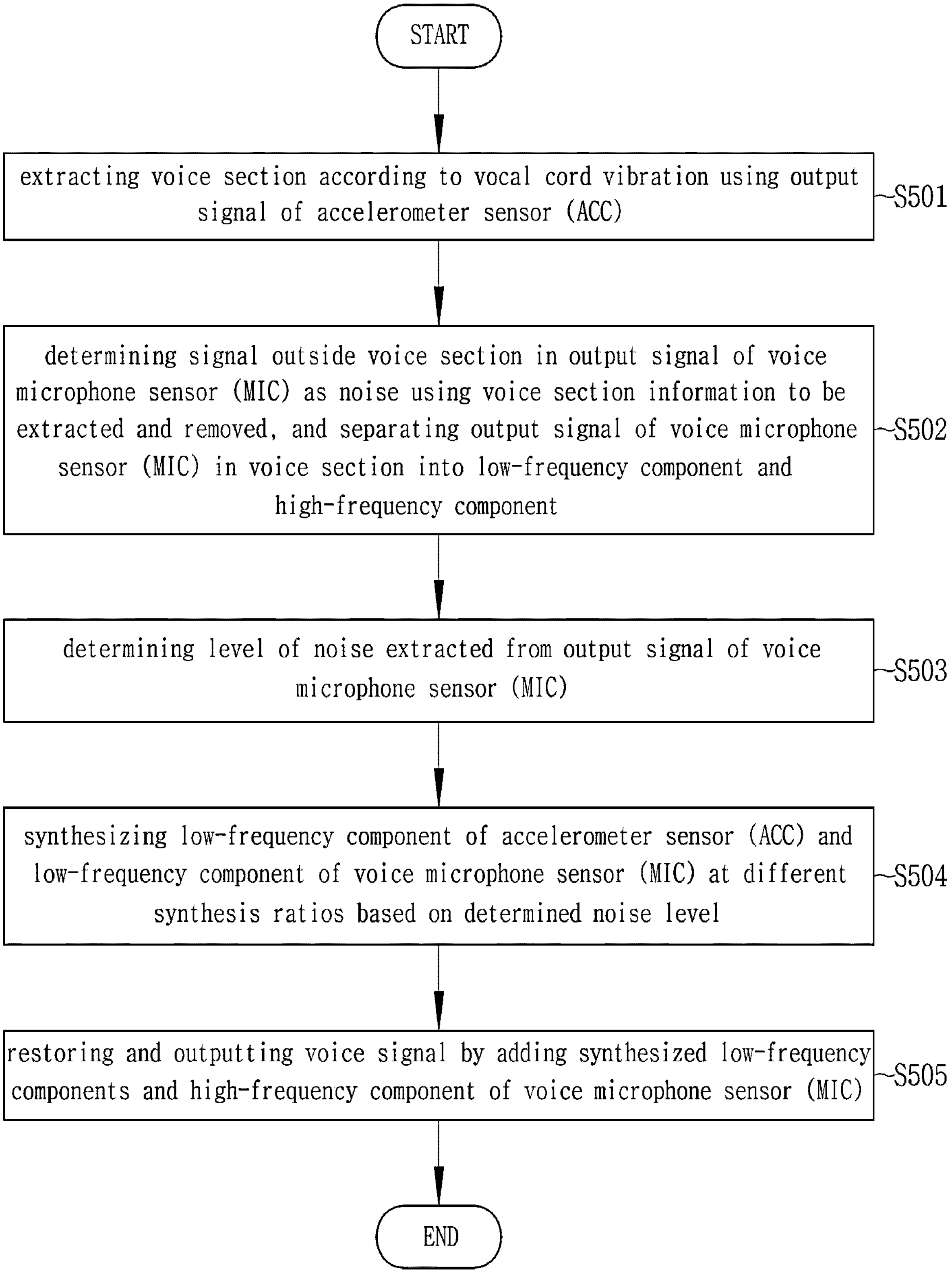
FIG. 5 is a flow chart showing a high-quality voice signal processing method through removal of ambient noise based on multi-sensor signal fusion according to the first embodiment of the present disclosure.

FIG. 5 is a flow chart showing the high-quality voice signal processing method through removal of ambient noise based on multi-sensor signal fusion according to the first embodiment of the present disclosure.

In the high-quality voice signal processing method through the removal of ambient noise based on the multiple-sensor signal fusion according to the first embodiment of the present disclosure, as shown in FIG. 5, firstly, a voice section according to vocal cord vibration is extracted using an output signal of the accelerometer sensor (ACC) 32 (S501).

Then, a signal outside the voice section in the output signal of the voice microphone sensor (MIC) 31 is determined as noise using voice section information to be extracted and removed, and the output signal of the voice microphone sensor (MIC) 31 in the voice section is separated into a low-frequency component and a high-frequency component (S502).

Further, a level of the noise extracted from the output signal of the voice microphone sensor (MIC) 31 is determined (S503).

Subsequently, a low-frequency component of the accelerometer sensor (ACC) 32 and the low-frequency component of the voice microphone sensor (MIC) 31 are synthesized at different synthesis ratios based on the determined noise level (S504).

In this case, in the process of synthesizing the low-frequency component of the accelerometer sensor (ACC) 32 and the low-frequency component of the voice microphone sensor (MIC) 31, it is preferable that the low-frequency component of the accelerometer sensor (ACC) 32 is further included when the level of the noise extracted from the output signal of the voice microphone sensor (MIC) 31 is higher than a reference value, and the low-frequency component of the voice microphone sensor (MIC) 31 is further included when the level of the noise extracted from the output signal of the voice microphone sensor (MIC) 31 is lower than the reference value.

Then, a voice signal is restored and outputted by adding the synthesized low-frequency components and the high-frequency component of the voice microphone sensor (MIC) 31 (S505).

The configuration of a high-quality voice signal processing device through removal of ambient noise based on multi-sensor signal fusion according to a second embodiment of the present disclosure is as follows.

Figure 6:
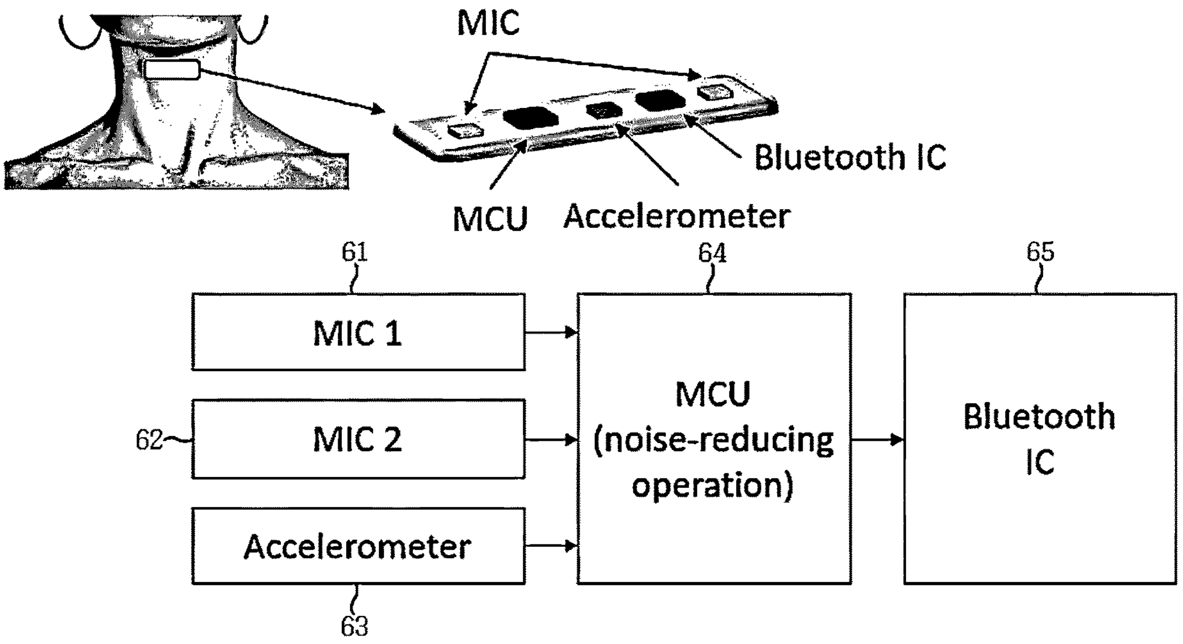
FIG. 6 is a configuration diagram of a voice signal processing device according to a second embodiment of the present disclosure.

FIG. 6 is a configuration diagram of the voice signal processing device according to the second embodiment of the present disclosure.

As shown in FIG. 6, the high-quality voice signal processing device according to the second embodiment of the present disclosure includes: a first and a second voice microphone sensor (MIC1, MIC2) 61, 62 that are spaced apart from each other to sense and output a speaker's voice signal; an accelerometer sensor (ACC) 63 that senses vibration of the vocal cords while in contact with the speaker's neck and outputs a signal; a noise reduction processing MCU 64 that extracts a voice section according to vocal cord vibration using the output signal of the accelerometer sensor (ACC), synthesizes a low-frequency component of the accelerometer sensor (ACC) 63 and low-frequency components of the first and a second voice microphone sensor (MIC1, MIC2) 61, 62 at different synthesis ratios based on a level of noise extracted from the output signals of the first and a second voice microphone sensor (MIC1, MIC2) 61, 62 using voice section information, and restores and outputs a voice signal by adding the synthesized low-frequency components and high-frequency components of the first and a second voice microphone sensor (MIC1, MIC2) 61, 62; and a wireless communication module 65 that externally outputs the restored voice signal.

In this case, in the process of synthesizing the low-frequency component of the accelerometer sensor (ACC) 63 and the low-frequency components of the first and the second voice microphone sensor (MIC1, MIC2) 61, 62, the noise reduction processing MCU 64 preferably causes the low-frequency component of the accelerometer sensor (ACC) 63 to be further included when the level of the noise extracted from the output signals of the first and the second voice microphone sensor (MIC1, MIC2) 61, 62 is higher than a reference value, and causes the low-frequency component of the first and the second voice microphone sensor (MIC1, MIC2) 61, 62 to be further included when the level of the noise extracted from the output signals of the first and the second voice microphone sensor (MIC1, MIC2) 61, 62 is lower than the reference value.

Then, the noise reduction processing MCU 64 determines a signal outside the voice section in the output signals of the first and the second voice microphone sensor (MIC1, MIC2) 61, 62 as noise using the voice section information, extracts and removes the output signal determined as noise, and separates the output signal of the first and the second voice microphone sensor (MIC1, MIC2) 61, 62 in the voice section into a low-frequency component and a high-frequency component.

Subsequently, it is preferable that the noise reduction processing MCU 64 primarily removes noise from the output signals of the first and the second voice microphone sensor (MIC1, MIC2) 61, 62 using the voice section information, secondarily removes noise from the output signals of the first and second voice microphone sensors (MIC1, MIC2) 61, 62 from which the noise is primarily removed using a beamforming algorithm, and thirdly removes noise from the output signals of the first and the second voice microphone sensor (MIC1, MIC2) 61, 72 from which the noise is secondarily removed using the voice section information again.

The detailed configuration of the noise reduction processing MCU 64 is as follows.

Figure 7:
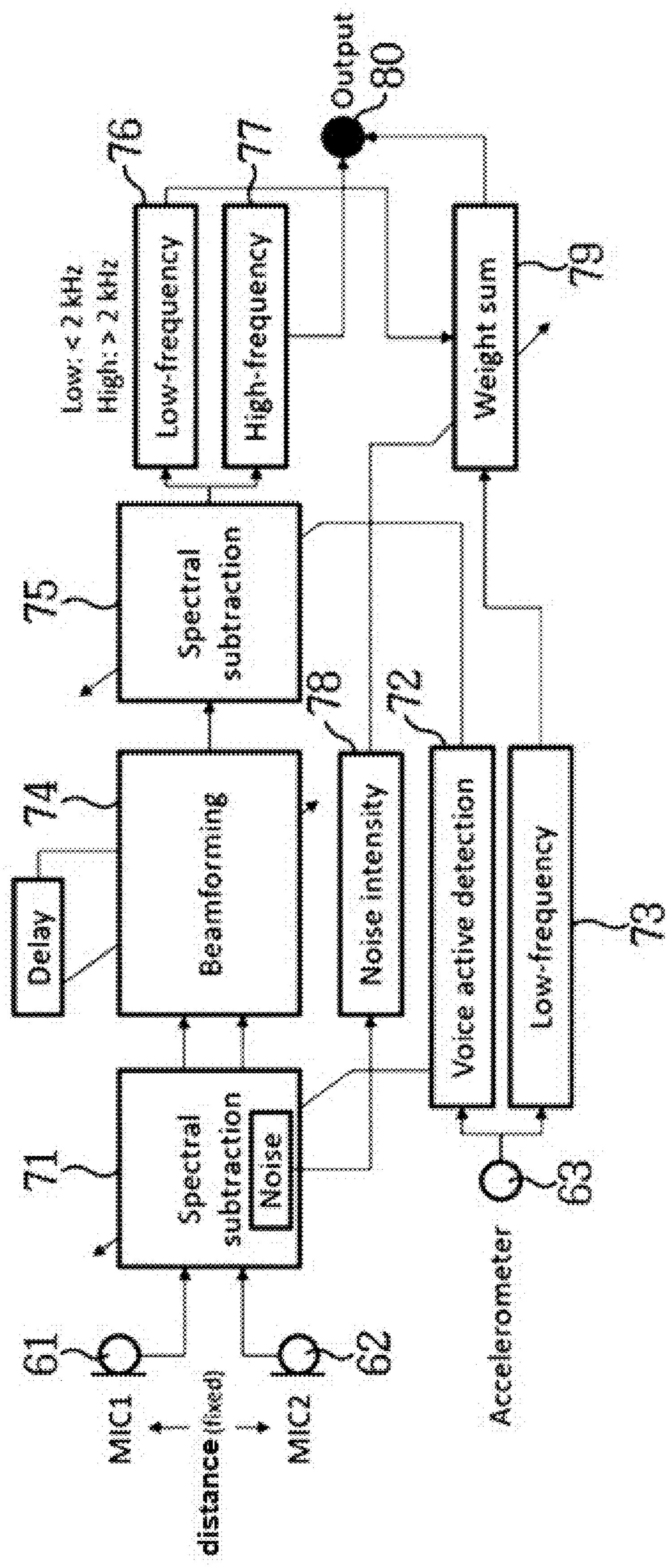
FIG. 7 is a detailed configuration diagram of a noise reduction processing MCU according to the second embodiment of the present disclosure.

FIG. 7 is a detailed configuration diagram of the noise reduction processing MCU 64 according to the second embodiment of the present disclosure.

As shown in FIG. 7, the noise reduction processing MCU 64 includes: a voice section extractor 72 for extracting a voice section according to vocal cord vibration using the output signal of the accelerometer sensor (ACC) 63; an ACC low-frequency component processing unit 73 that processes the low-frequency component signal of the accelerometer sensor (ACC) 63; a first noise extraction and removal unit 71 that extracts and primarily removes noise from the output signals of the first and the second voice microphone sensor (MIC1, MIC2) 61, 62 using the voice section information; a second noise extraction and removal unit 74 that secondarily removes noise from the output signals of the first and the second voice microphone sensor (MIC1, MIC2) 61, 62 from which the noise has been primarily removed using the beamforming algorithm; a third noise extraction and removal unit 75 that thirdly removes noise from the output signals of the first and the second voice microphone sensor (MIC1, MIC2) 61, 62 from which the noise has been secondarily removed using the voice section information again; a noise level determination unit 78 that determines a level of the noise extracted in the first noise extraction and removal unit 71; an MIC low-frequency component processing unit 76 and a MIC high-frequency component processing unit 77 that separate and process the output signals of the first and the second voice microphone sensor (MIC1, MIC2) 61, 62 from which the noise has been thirdly removed into a low-frequency component and a high-frequency component; an MIC and ACC low-frequency component synthesis unit 79 that synthesizes the low-frequency component of the accelerometer sensor (ACC) 63 and the low-frequency components of the first and the second voice microphone sensor (MIC1, MIC2) 61, 62 at different synthesis ratios based on the noise level determined by the noise level determination unit 78; and a voice signal restoration output unit 80 that restores and outputs a voice signal by adding the synthesized low-frequency components and the high-frequency components of the first and the second voice microphone sensor (MIC1, MIC2) 61, 62.

Hereinafter, a high-quality voice signal processing method through ambient through removal of ambient noise based on multi-sensor signal fusion according to the second embodiment of the present disclosure will be described in detail.

Figure 8:
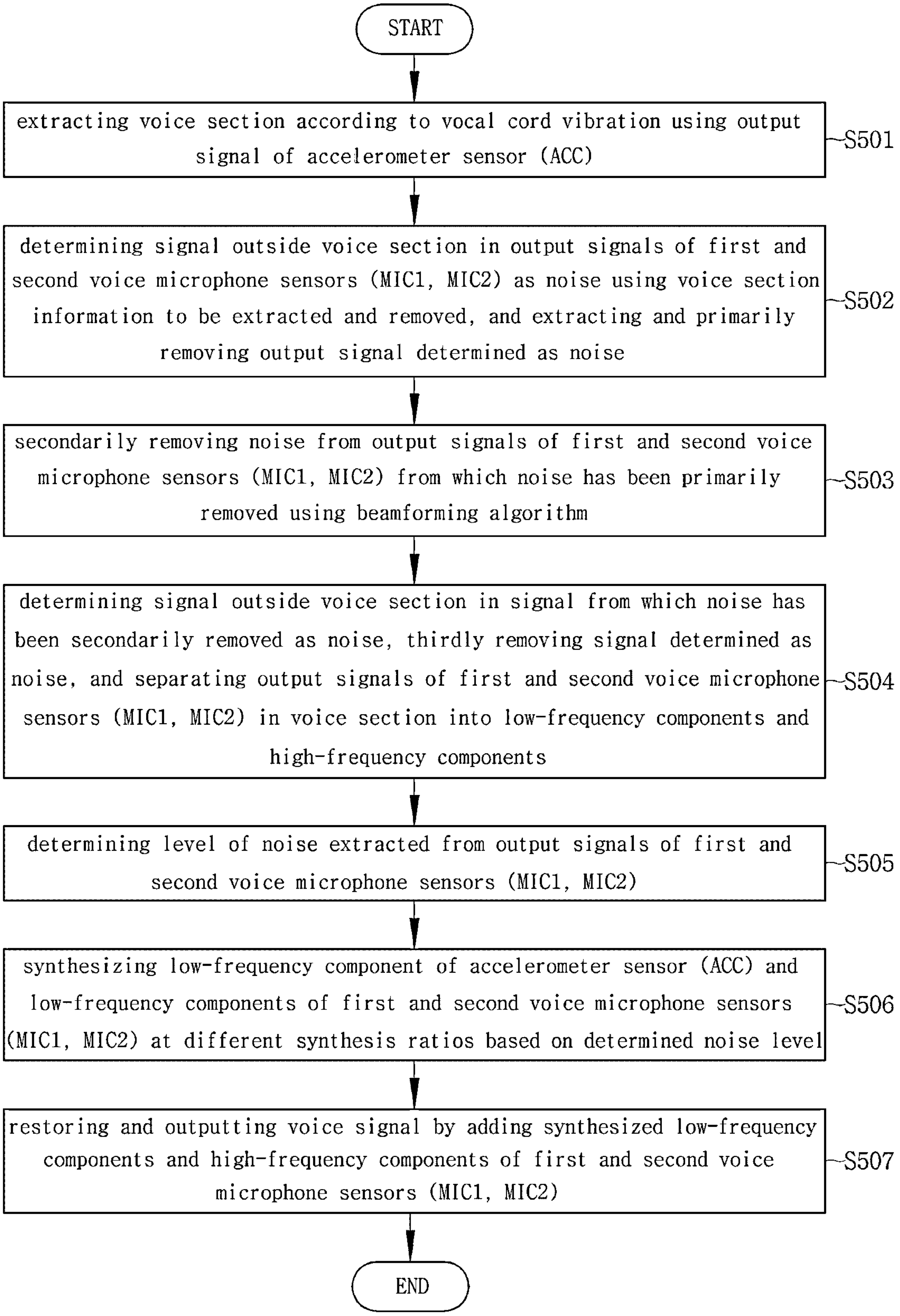
FIG. 8 is a flow chart showing a high-quality voice signal processing method through removal of ambient noise based on multi-sensor signal fusion according to the second embodiment of the present disclosure.

FIG. 8 is a flow chart showing the high-quality voice signal processing method through removal of ambient noise based on multi-sensor signal fusion according to the second embodiment of the present disclosure.

Firstly, a voice section according to vocal cord vibration is extracted using the output signal of the accelerometer sensor (ACC) 63 (S801).

Then, a signal outside the voice section in output signals of a first and a second voice microphone sensor (MIC1, MIC2) 61, 62 is determined as noise using voice section information, and the output signal determined as noise is extracted and primarily removed (S802).

Further, noise is secondarily removed from the output signals of the first and the second voice microphone sensor (MIC1, MIC2) 61, 62 from which the noise has been primarily removed using the beamforming algorithm (S803).

Subsequently, a signal outside the voice section in the signal from which the noise has been secondarily removed is determined as noise, the signal determined as noise is thirdly removed, and the output signals of the first and second voice microphone sensor (MIC1, MIC2) 61, 62 in the voice section are separated into low-frequency components and high-frequency components (S804).

Then, a level of the noise extracted from the output signals of the first and second voice microphone sensor (MIC1, MIC2) 61, 62 is determined (S805).

Next, a low-frequency component of the accelerometer sensor (ACC) 63 and the low-frequency components of the first and second voice microphone sensors (MIC1, MIC2) 61, 62 are synthesized at different synthesis ratios based on the determined noise level (S806).

In this case, in the process of synthesizing the low-frequency component of the accelerometer sensor (ACC) 63 and the low-frequency components of the first and second voice microphone sensors (MIC1, MIC2) 61, 62, it is preferable that the low-frequency component of the accelerometer sensor (ACC) 63 is further included when the level of the noise extracted from the output signals of the first and second voice microphone sensors (MIC1, MIC2) 61, 62 is higher than a reference value, and the low-frequency components of the first and second voice microphone sensors (MIC1, MIC2) 61, 62 are further included when the level of the noise extracted from the output signals of the first and second voice microphone sensors (MIC1, MIC2) 61, 62 is lower than the reference value.

Then, a voice signal is restored and outputted by adding the synthesized low-frequency components and the high-frequency components of the first and second voice microphone sensors (MIC1, MIC2) 61, 62 (S807).

The high-quality voice signal processing device and method through removal of ambient noise based on multi-sensor signal fusion according to the present disclosure described above enables robust voice signal processing in an external noise environments through multi-sensor signal fusion using the accelerometer sensor (ACC) and the voice microphone sensor (MIC), and the quality of the voice signal can be improved by extracting and removing noise from the output signal of the voice microphone sensor (MIC) using the voice section information of the accelerometer sensor (ACC), determining a level of the noise extracted from the output signal of the voice microphone sensor (MIC), and synthesizing, based on the determined noise level, the low-frequency component of the accelerometer sensor (ACC) and the low-frequency component of the voice microphone sensor (MIC) at different synthesis ratios.

As described above, it will be understood that the present disclosure is implemented in a modified form without departing from the essential characteristics of the present disclosure.

Therefore, the specified embodiments should be considered from a descriptive point of view rather than a limiting point of view. The scope of the present disclosure is defined in the claims rather than the foregoing description, and it should be interpreted that all differences within the equivalent range are included in the present disclosure.

DESCRIPTION OF REFERENCE NUMERALS

31: voice microphone sensor (MIC)
32: accelerometer sensor (ACC)
33: noise reduction processing MCU
34: wireless communication module

What is claimed is:

1. A high-quality voice signal processing device through removal of ambient noise based on multi-sensor signal fusion, the device comprising:

a voice microphone sensor that senses and outputs a speaker's voice signal;

an accelerometer sensor that senses vibration of the speaker's vocal cords and outputs a signal;

a noise reduction processing microcontroller unit (MCU) that extracts a voice section according to vocal cord vibration using the output signal of the accelerometer sensor, determines a signal outside the voice section in the output signal of the voice microphone sensor as noise using voice section information, extracts and removes the output signal determined as noise, synthesizes a low-frequency component of the accelerometer sensor and a low-frequency component of the voice microphone sensor at different synthesis ratios based on a level of the noise extracted from the output signal of the voice microphone sensor using voice section information, and restores and outputs a voice signal by adding the synthesized low-frequency components and a high-frequency component of the voice microphone sensor; and a wireless communication module that externally outputs the restored voice signal, wherein in synthesizing the low-frequency component of the accelerometer sensor and the low-frequency component of the voice microphone sensor, the noise reduction processing MCU causes the low-frequency component of the accelerometer sensor to be further included when the level of the noise extracted from the output signal of the voice microphone sensor is higher than a reference value, and causes the low-frequency component of the voice microphone sensor to be further included when the level of the noise extracted from the output signal of the voice microphone sensor is lower than the reference value.

2. The high-quality voice signal processing device of claim 1, wherein the noise reduction processing MCU separates the output signal of the voice microphone sensor in the voice section into the low-frequency component of the voice microphone sensor and a high-frequency component of the voice microphone sensor.

3. The high-quality voice signal processing device of claim 1, wherein the noise reduction processing MCU includes:

a voice section extractor for extracting a voice section according to vocal cord vibration using the output signal of the accelerometer sensor;

an accelerometer sensor low-frequency component processing unit that processes the low-frequency component of the accelerometer sensor;

a voice microphone sensor noise extraction and removal unit that determines the signal outside the voice section in the output signal of the voice microphone sensor as noise using the voice section information, and extracts and removes the signal determined as noise;

a noise level determination unit that determines a level of the noise extracted from the output signal of the voice microphone sensor;

a voice microphone sensor low-frequency component processing unit and a voice microphone sensor high-frequency component processing unit that separate and process the output signal of the voice microphone sensor in the voice section into the low-frequency component of the voice microphone sensor and the high-frequency component of the voice microphone sensor;

a synthesis unit that synthesizes the low-frequency component of the accelerometer sensor and the low-frequency component of the voice microphone sensor at different synthesis ratios based on the noise level determined by the noise level determination unit; and a voice signal restoration output unit that restores and outputs a voice signal by adding the synthesized low-frequency components and the high-frequency component of the voice microphone sensor.

4. A high-quality voice signal processing device through removal of ambient noise based on multi-sensor signal fusion, the device comprising:

a first and a second voice microphone sensor spaced apart from each other to sense and output a speaker's voice signal;

an accelerometer sensor that senses vibration of the speaker's vocal cords and outputs a signal;

a noise reduction processing MCU that extracts a voice section according to vocal cord vibration using the output signal of the accelerometer sensor, determines a signal outside the voice section in the output signal of the first and second voice microphone sensor as noise using voice section information, extracts and removes the output signal determined as noise, synthesizes a low-frequency component of the accelerometer sensor and low-frequency components of the first and the second voice microphone sensor at different synthesis ratios based on a level of noise extracted from the output signals of the first and the second voice microphone sensor using voice section information, and restores and outputs a voice signal by adding the synthesized low-frequency components and high-frequency components of the first and the second voice microphone sensor; and a wireless communication module that externally outputs the restored voice signal, wherein in synthesizing the low-frequency component of the accelerometer sensor and the low-frequency components of the first and the second voice microphone sensor, the noise reduction processing MCU causes the low-frequency component of the accelerometer sensor to be further included when the level of the noise extracted from the output signals of the first and the second voice microphone sensor is higher than a reference value, and causes the low-frequency component of the first and the second voice microphone sensor to be further included when the level of the noise extracted from the output signals of the first and the second voice microphone sensor is lower than the reference value.

5. The high-quality voice signal processing device of claim 4, wherein the noise reduction processing MCU separates the output signals of the first and the second voice microphone sensor in the voice section into the low-frequency component of the first and the second voice microphone sensor and a high-frequency component of the first and the second voice microphone sensor.

6. The high-quality voice signal processing device of claim 5, wherein the noise reduction processing MCU primarily removes noise from the output signals of the first and the second voice microphone sensor using the voice section information, secondarily removes noise from the output signals of the first and second voice microphone sensors from which the noise is primarily removed using a beamforming algorithm, and thirdly removes noise from the output signals of the first and the second voice microphone sensor from which the noise is secondarily removed using the voice section information again.

7. The high-quality voice signal processing device of claim 4, wherein the noise reduction processing MCU includes:

a voice section extractor for extracting a voice section according to vocal cord vibration using the output signal of the accelerometer sensor;

an accelerometer sensor low-frequency component processing unit that processes the low-frequency component of the accelerometer sensor;

a noise extraction and removal unit that performs a primary noise extraction and removal using the voice section information, a secondary noise extraction and removal using a beamforming algorithm, and a tertiary noise extraction and removal using the voice section information again on the output signals of the first and the second voice microphone sensor;

a noise level determination unit that determines a level of the noise extracted through the first noise extraction and removal in the noise extraction and removal unit;

a voice microphone sensor low-frequency component processing unit and a voice microphone sensor high-frequency component processing unit that separate and process the output signals of the first and the second voice microphone sensor on which the tertiary noise extraction and removal has been performed into a low-frequency component and a high-frequency component of the first and the second voice microphone sensor;

a synthesis unit that synthesizes the low-frequency component of the accelerometer sensor and the low-frequency components of the first and the second voice microphone sensor at different synthesis ratios based on the noise level determined by the noise level determination unit; and a voice signal restoration output unit that restores and outputs a voice signal by adding the synthesized low-frequency components and the high-frequency components of the first and the second voice microphone sensor.

8. The high-quality voice signal processing device of claim 7, wherein the noise extraction and removal unit includes:

a first noise extraction and removal unit that extracts and primarily removes signals outside the voice section as noise from the output signals of the first and the second voice microphone sensor using the voice section information;

a second noise extraction and removal unit that secondarily removes noise from the output signals of the first and the second voice microphone sensor from which the noise is firstly removed using a beamforming algorithm; and a third noise extraction and removal unit that extracts and thirdly removes signals outside the voice section as noise from the output signals of the first and second voice microphone sensor from which the noise has been secondarily removed using the voice section information again.

9. A high-quality voice signal processing method through removal of ambient noise based on multi-sensor signal fusion, the method comprising:

extracting a voice section according to vocal cord vibration using an output signal of an accelerometer sensor;

determining a signal outside the voice section in an output signal of a voice microphone sensor as noise using voice section information, extracting and removing the output signal determined as noise, and separating the output signal of the voice microphone sensor in the voice section into a low-frequency component of the voice microphone sensor and a high-frequency component of the voice microphone sensor;

determining a level of the noise extracted from the output signal of the voice microphone sensor;

synthesizing a low-frequency component of the accelerometer sensor and the low-frequency component of the voice microphone sensor at different synthesis ratios based on the determined noise level; and restoring and outputting a voice signal by adding the synthesized low-frequency components and the high-frequency component of the voice microphone sensor, wherein in the synthesizing of the low-frequency component of the accelerometer sensor and the low-frequency component of the voice microphone sensor, the low-frequency component of the accelerometer sensor is further included when the level of the noise extracted from the output signal of the voice microphone sensor is higher than a reference value, and the low-frequency component of the voice microphone sensor is further included when the level of the noise extracted from the output signal of the voice microphone sensor is lower than the reference value.

10. A high-quality voice signal processing method through removal of ambient noise based on multi-sensor signal fusion, the method comprising:

extracting a voice section according to vocal cord vibration using an output signal of an accelerometer sensor;

determining a signal outside the voice section in output signals of a first and a second voice microphone sensor as noise using voice section information, and extracting and primarily removing the output signal determined as noise;

secondarily removing noise from the output signals of the first and the second voice microphone sensor from which the noise has been primarily removed using a beamforming algorithm;

determining a signal outside the voice section as noise in the signal from which the noise has been secondarily removed, thirdly removing noise the signal determined as noise, and separating the output signals of the first and second voice microphone sensors in the voice section into low-frequency components of the first and second voice microphone sensors and high-frequency components of the first and second voice microphone sensors;

determining a level of the noise extracted from the output signals of the first and second voice microphone sensors;

synthesizing a low-frequency component of the accelerometer sensor and the low-frequency components of the first and second voice microphone sensors at different synthesis ratios based on the determined noise level; and restoring and outputting a voice signal by adding the synthesized low-frequency components and the high-frequency components of the first and second voice microphone sensors, wherein in the synthesizing of the low-frequency component of the accelerometer sensor and the low-frequency components of the first and second voice microphone sensors, the low-frequency component of the accelerometer sensor is further included when the level of the noise extracted from the output signals of the first and second voice microphone sensors is higher than a reference value, and the low-frequency components of the first and second voice microphone sensors are further included when the level of the noise extracted from the output signals of the first and second voice microphone sensors is lower than the reference value.

* * * * *